L. W. Buxton,
Jaw Trap,

No. 27,967.  Patented Apr. 24, 1860.

Witnesses.
R. Way
A. P. Hale Jr

Inventor.
Levi W. Buxton

UNITED STATES PATENT OFFICE.

LEVI W. BUXTON, OF NASHUA, NEW HAMPSHIRE.

ANIMAL-TRAP.

Specification of Letters Patent No. 27,967, dated April 24, 1860.

*To all whom it may concern:*

Be it known that I, LEVI W. BUXTON, of Nashua, in the county of Hillsboro and State of New Hampshire, have invented an Improved Trap for Catching Mink or Various other Wild Animals; and do hereby declare the same is fully described and represented in the following specification and the accompanying drawings, of which—

Figure 4:
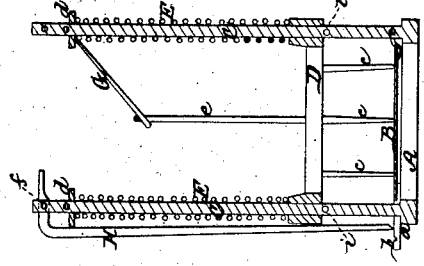
Figure 3:
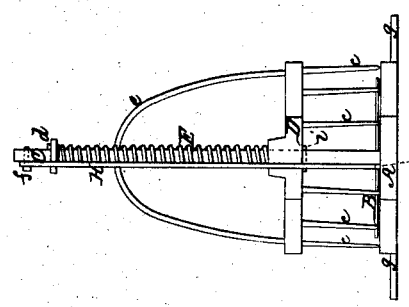
Figure 2:
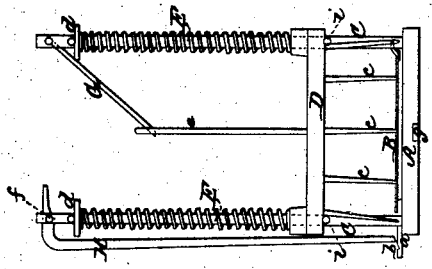
Figure 1:
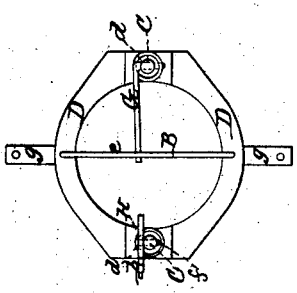

Figure 1, is a top view; Fig. 2, a front elevation; Fig. 3, a side elevation, and Fig. 4, a longitudinal section of it.

In such drawings, A, exhibits the base or carrier of the bait platform, B, the latter being circular in form and provided with an arm, $a$, extending from it and furnished with a notch, $b$, as shown in Figs. 1, and 2. From the said carrier, A, two rods or posts, C, C, project upward at right angles, and carry an annular frame D, which may be termed the "spear frame" from the fact of it being furnished with a series of long spears, $c$, $c$, &c., which project down from it on opposite sides of and around the bait platform as shown in the drawings. The said spear frame D slides freely on the two rods, C, C, and against two helical springs E, E, that envelop the said rods respectively at their upper ends bear against collars or shoulders $d$, $d$, attached to or fixed stationary upon the two rods. Furthermore, the frame, D, is furnished with an arched brail or handle $e$, extending upward from it and midway between the two posts as shown in the drawings. The bait platform, B, is to be hinged either to one of the posts or to the carrier A, its notched arm being caused to lie alongside of and project beyond the other of the said arms. One end of a holding bar, G, is hinged to the upper end of that post to which the bait platform is connected while from the upper end or part of the other post, the fulcrum, $f$, of a bent tripping lever, H, extends as seen in the drawings, the said tripping lever having the form and being arranged relatively to the bait platform, as shown in Figs. 1, and 2.

From the carrier A, two arms or ears $g$, $g$, project in opposite directions, and serve to enable a person to maintain the carrier on the ground by his feet while with his hands he may be in the act of raising the spear frame and setting the trap. In order to accomplish the latter, the holding bar G, after the spear frame may have been raised upward high enough is to be elevated underneath the brail and be placed on the shorter arm of the tripping lever H. This having been accomplished, the bait platform should be raised upward so as to cause the lower end of the longer arm of the tripping lever to enter the notch $b$. In this way the trap will be set and an animal can not attack the bait from any side of the platform without passing below some one or more of the spear points, which after the trap may have been sprung will descend with the frame D, and pass into and secure the animal, the said frame bringing up against stops or pins, $i$, $i$, extending from the two posts.

For the purposes of the trapper of small animals, such as mink, sable, ermine, and various others this trap will be found very useful and more efficient than the ordinary double jaw steel trap.

I claim—

1. Arranging the spear frame D, and its operating springs, E, E, on rods, C, C, extended from the bait platform carrier A, in combination with arranging the tripping lever, H, and the holding bar G, on the said posts and so as to operate with respect to the bait platform and the brail of the frame, D, substantially as described.

2. I also claim the arrangement of the series of points or lances, $c$, $c$, &c., with respect to the bait platform B, viz. so as to surround it on opposite sides as described.

L. W. BUXTON.

Witnesses:
R. N. EDDY,
F. P. KALEP.